United States Patent
Tao et al.

(10) Patent No.: US 7,756,099 B2
(45) Date of Patent: Jul. 13, 2010

(54) METHOD AND SYSTEM FOR SELECTING ANTENNAS ADAPTIVELY IN OFDMA NETWORKS

(75) Inventors: Zhifeng Tao, Allston, MA (US); Chun Nie, Elmhurst, NY (US); Neelesh B. Mehta, Needham, MA (US); Andreas F. Molisch, Arlington, MA (US); Jinyun Zhang, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 611 days.

(21) Appl. No.: 11/777,356

(22) Filed: Jul. 13, 2007

(65) Prior Publication Data

US 2009/0016312 A1    Jan. 15, 2009

(51) Int. Cl.
*H04B 7/208* (2006.01)
(52) U.S. Cl. ............... 370/344; 370/252; 370/431; 375/228; 455/436; 455/450
(58) Field of Classification Search ........... 370/334, 370/339, 344, 347, 437, 442; 455/562.1
See application file for complete search history.

(56) References Cited

U.S. PATENT DOCUMENTS

| | | | | |
|---|---|---|---|---|
| 2002/0141349 A1* | 10/2002 | Kim et al. | ............... | 370/252 |
| 2006/0120395 A1* | 6/2006 | Xing et al. | ............... | 370/431 |
| 2008/0095223 A1* | 4/2008 | Tong et al. | ............... | 375/228 |

FOREIGN PATENT DOCUMENTS

WO    0209312 A    1/2002
WO    2005034387 A    4/2005
WO    2007040564 A    4/2007

OTHER PUBLICATIONS

Institute for Infocomm Research (I2R) et al: "Transmit Antenna Selection Techniques for Uplink E-Utra" 3GPP Draft; RI-051398, 3rd Generation Partnership Project (3GPP), Mobile Competence Centre; 650, Route Des Lucioles; F-06921 Sophia-Antipolis Cedex, France, vol. tsq_ran\WG1_RL1\TSGR1_43\Docs, No. Seoul, Korea; 20051107, Nov. 1, 2005, pp. 3-4, XP050100990.

Mitsubishi Electric et al,: "Low Cost Training for Transmit Antenna Selection on the Uplink" 3GPP Draft; R1-063089, 3RD Generation Partnership Project (3GPP), Mobile Partnership Project (3GPP), Mobile Competence Centre; 650, Route Des Lucioles; F-06921 Sophia-Antipolis Cedex; France, vol. tsq_ran\WG1_RL1\TSGR1_47\Docs, No. Riga, Latvia; 20061106, Nov. 1, 2006, p. 4, XP050103548.

* cited by examiner

*Primary Examiner*—Danh C. Le
*Assistant Examiner*—Dinh P Nguyen
(74) *Attorney, Agent, or Firm*—Dirk Brinkman; Gene Vinokur

(57) ABSTRACT

A method selects antennas in an OFDMA network. A channel state of a downlink is measured using a downlink subframe received in a mobile station from a base station. A channel state of an uplink is measured using an uplink subframe received in the base station from the mobile station. Next, the method compares the channel states to determine whether the downlink and the uplink are reciprocal or not. The mobile station can perform receive antenna selection based on the quality of the downlink channel state. The mobile station can also perform transmit antenna selection when instructed by the base station.

15 Claims, 13 Drawing Sheets

METHOD AND SYSTEM FOR SELECTING ANTENNAS ADAPTIVELY IN OFDMA NETWORKS

FIELD OF THE INVENTION

This invention relates generally to wireless networks, and more particularly to selecting antennas in OFDMA networks.

BACKGROUND OF THE INVENTIONS

Orthogonal Frequency-Division Multiplexing (OFDM)

OFDM uses multiple orthogonal sub-carriers to transmit information at a relatively low symbol rate. As an advantage, OFDM can withstand severe changes in channel state and quality, such as high frequency attenuation, narrowband interference, and frequency-selective fading due to multipath, using a single carrier. Channel equalization is simplified because OFDM uses slowly-modulated narrowband signals rather than one rapidly-modulated wideband signal. A low symbol rate enables guard intervals and time-spreading, while eliminating inter-symbol interference (ISI). Some of the subcarriers in some of the OFDM symbols carry pilot signals for estimating the channel state, and performing synchronization.

Orthogonal Frequency Division Multiple Access (OFDMA)

As a disadvantage, OFDM does not provide multi-user channel access to a channel. OFDMA corrects this problem by time, frequency or coding separation, of multiple users. That is, frequency-division multiple access is achieved by assigning different OFDM sub-channels to different users. A sub-channel is a group of subcarriers, which need not be physically contiguous. OFDMA is used in the uplink of the IEEE 802.16 Wireless MAN standard, commonly referred to as WiMAX.

WiMAX

The IEEE 802.16 standard defines an air interface, while WiMAX includes both the IEEE 802.16 air interface and the networking aspect of the system. WiMAX is a broadband wireless access technology, see "IEEE Standard for Local and Metropolitan Area Networks—Part 16: Air Interface for Fixed Broadband Wireless Access Systems," IEEE Computer Society and the IEEE Microwave Theory and Techniques Society, October 2004, and "IEEE Standard for Local and Metropolitan Area Networks—Part 16: Air Interface for Fixed Broadband Wireless Access Systems, Amendment 2; Physical and Medium Access Control Layers for Combined Fixed and Mobile Operation in Licensed Bands," IEEE Computer Society and the IEEE Microwave Theory and Techniques Society, February 2006, incorporated herein by reference.

Antenna Selection

According to the IEEE 802.16 standards, multiple antenna elements and radio frequency (RF) chains are supported in base stations (BS) and mobile stations (MS). Due to the high cost of RF chains and relatively low cost of antennas, the number of RF chain (N) is usually less than the number of antennas (M), that is, $N \leq M$. Therefore, in order to transmit/receive signals, the RF chains are connected to selected antennas.

It is known that each antenna provides a different propagation path that experiences a distinct channel gain. Therefore, it is important to selectively connect N of the M antennas to N RF chains so that the transmitting and receiving performance at the BS and the MS is optimized. This function is known as antenna selection (AS). Antenna selection is a method to improve system performance in terms of bit error rate (BER), signal to noise ratio (SNR) and throughput (TH).

Antenna selection is also used by other standards, such as 3GPP Long Term Evolution (LTE), R1-063089, "Low cost training for transmit antenna selection on the uplink," Mitsubishi Electric, NTT DoCoMo, 3GPP RAN1#47, R1-063090, "Performance comparison of training schemes for uplink transmit antenna selection," Mitsubishi Electric, NTT DoCoMo, 3GPP RAN1#47, R1-063091, "Effects of the switching duration on the performance of the within TTI switching scheme for transmit antenna selection in the uplink," Mitsubishi Electric, NTT DoCoMo, 3GPP RAN1#47, and R1-051398, "Transmit Antenna Selection Techniques for Uplink E-UTRA," Institute for Infocomm Research (I2R), Mitsubishi Electric, NTT DoCoMo, 3GPP RAN1#43, R1-070524, "Comparison of closed-loop antenna selection with open-loop transmit diversity (antenna switching between TTIs)," Mitsubishi Electric, 3GPP RAN1#47bis, all incorporated herein by reference.

WiMAX Network

FIG. 1 shows a conventional IEEE 802.16 WiMAX network. The network uses a point-to-multipoint communications between BS, and MS. The BS manages and coordinates all communications with the MS1-MS3 in a particular cell on connections 101-103, respectively. Each MS is in direct communication with one BS, and the BS communicates with an infrastructure 110 or "backbone" of the network. All communications to/from the MS must pass through the BS. In order to carry out basic wireless communication, both the BS and the MS are equipped with at least one RF chain. Normally, the number of antenna elements and RF chains is equal at a BS, which implies that N=M. However, given the limitation of cost, size and energy consumption, it is usually true that an MS has more antennas than RF chains. Therefore, antenna selection is used at the MS.

The legacy IEEE 802.16 standard supports both time division duplex (TDD) and frequency division duplex (FDD) modes. The antenna selection describes herein applies to both modes.

Frame Structure

As shown in FIG. 2, the TDD mode uses a frame structure on the uplink from the MS to the BS and the downlink from the BS to the MS. The preamble, FCH, bursts, maps, and gaps TTG and RTG are completely defined in the standard. In FIG. 2, the horizontal axis indicates time, and the vertical axes subchannels. A first subframe is for downlink (DL) transmission, and the second subframe is for the uplink (UL). In both the downlink and the uplink subframes of IEEE 802.16, OFDMA is used for multi-user channel access. OFDMA separates sets of orthogonal subcarriers (sub-channels) in the frequency domain and time slots in the time domain so that multiple MS can share all bandwidth resources, such as time slot and frequency subcarriers. Thus, in contrast with OFDM where only a single user can be accommodated at any one time, OFDMA allows multiple MSs to communicate concurrently in OFDMA system.

In FIG. 1, each connection, such as 101, 102 and 103, between the BS and the MS is allocated a time-frequency resource, which contains a two dimensional block, i.e., time duration and frequency subcarriers, With OFDMA technology, the BS can communicate with all MSs on connection 103, 102, 103 by using two-dimensional bandwidth resource.

In the IEEE 802.16 standard, a minimal resource unit to be allocated is a slot 200. A size of the slot 200 is based on the permutation modes that the MS and the BS use for transmissions in uplink and downlink. A permutation mode defines the type of resource allocation in time and frequency domains.

Different modes are defined for the UL and the DL. By using a specific permutation, a given number of OFDMA symbols and subcarriers are included in each slot.

FIG. 3 shows a structure of an OFDMA symbol 300, where $T_s$ is the symbol duration, $T_b$ is the information (data) duration and $T_g$ is the cyclic prefix CP 301. The CP 301 is derived from the data at the end of $T_b$, which are copied to the beginning of the symbol. $T_g$ is a configurable time period and is approximately a few microseconds long. The frequency subcarriers are generated by a fast Fourier transform (FFT) to construct the complete frequency spectrum. Frequency subcarriers are classified into groups according to different uses, such as DC, data, pilot and guard subcarriers.

The current IEEE 802.16e standard, which uses OFDMA for both downlink and uplink multiple access, does not support antenna selection at mobile stations. Thus, it is desired to provide antenna selection for handsets in OFDMA type of networks. Because the OFDMA, unlike OFDM, allows concurrent access to the channel by multiple users, antenna selection is non-trivial.

SUMMARY OF THE INVENTION

A method selects antennas in an OFDMA network. The downlink channel state of a downlink is measured using a downlink subframe received in a mobile station from a base station.

The uplink channel state of an uplink is measured using an uplink subframe received in the base station from the mobile station.

Next, the method determines whether the downlink and the uplink are unreciprocal based on the channel states of the downlink and the uplink. If true, a set of antennas is selected in the mobile station. The mobile station can select a set of transmit antennas, a set of receive antennas or both. Typically, the base station determines which transmit antennas to use, the mobile station determines the receive antennas.

DETAILED DESCRIPTION OF THE PREFERRED EMBODIMENTS

The following terms are defined and used herein.

AAS zone: Adaptive antenna system (AAS) is an option for an IEEE 802.16 network and is defined in the standards. AAS uses multiple antenna elements to improve system coverage and capacity by directing antenna radiation to individual MS. AAS is able to steer radiation beams spatially and achieve high spectral reuse and enhanced diversity gain. AAS zone is a period of time that is dedicated for AAS-supported MSs during each frame.

Non-AAS zone: Non-AAS zone is a time period in each frame, which is used for non-AAS MSs.

Slot: A slot is the minimum resource unit allocated to an MS in UL and DL. A slot is two dimensional and is measured in time duration and frequency subcarriers.

Antenna Selection (AS): AS is used during transmitting and receiving at the MS or the BS to optimize the system performance. AS can be classified into Transmit Antenna Selection (TAS) and Receive Antenna Selection (RAS), which are intended to select antenna for transmitting and receiving, respectively.

Pilot Subcarrier: In IEEE 802.16, the subcarriers are divided into several groups, including data subcarriers, pilot subcarriers, DC subcarriers, and guard subcarriers. The receiver uses received signal on pilot subcarriers to estimate the channel. The allocation of pilot in the entire set of subcarriers depends on the permutation mode.

Data Subcarrier: Data subcarrier is the subcarrier used for data transmissions.

Guard Subcarrier: Guard subcarrier is the subcarrier used to avoid inter-spectrum interference between two frequency bands.

Figure 1:
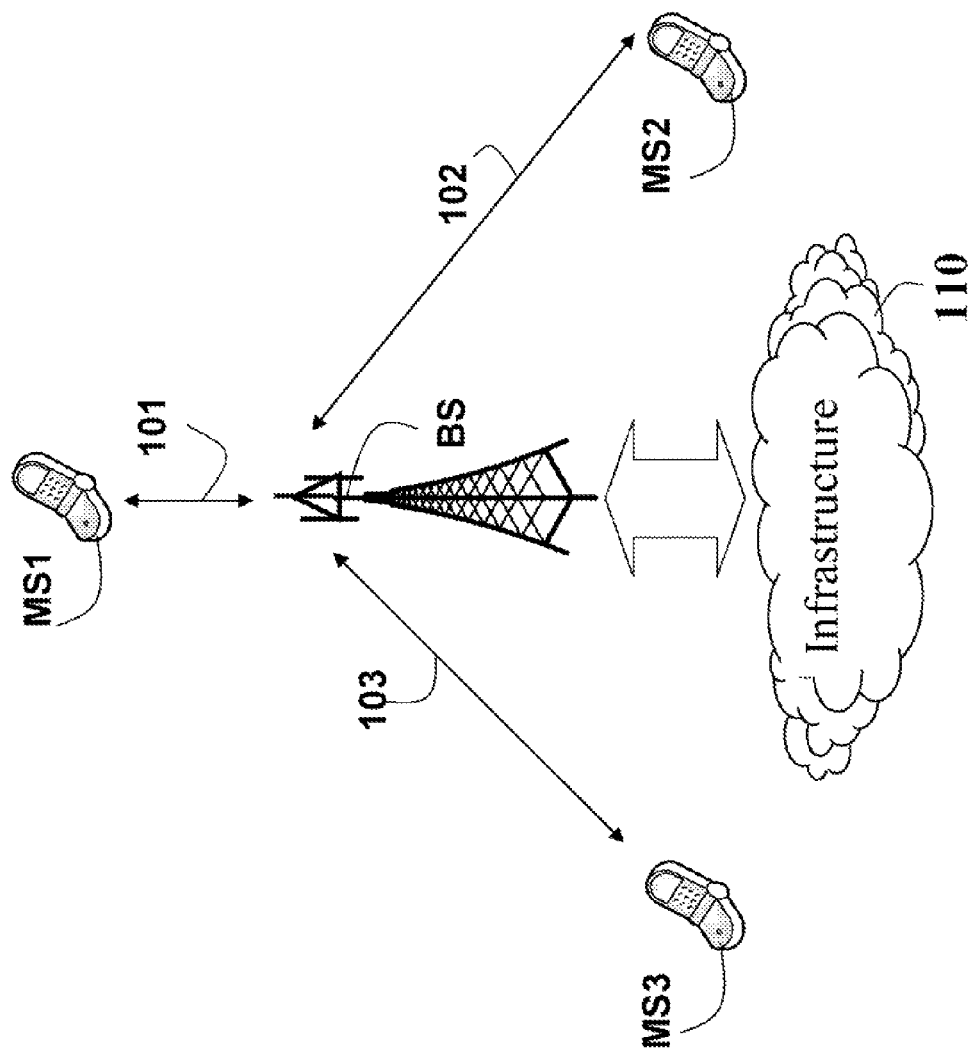
FIG. 1 is a schematic of an IEEE 802.16 WiMAX network used by embodiments of the invention.
Figure 2:
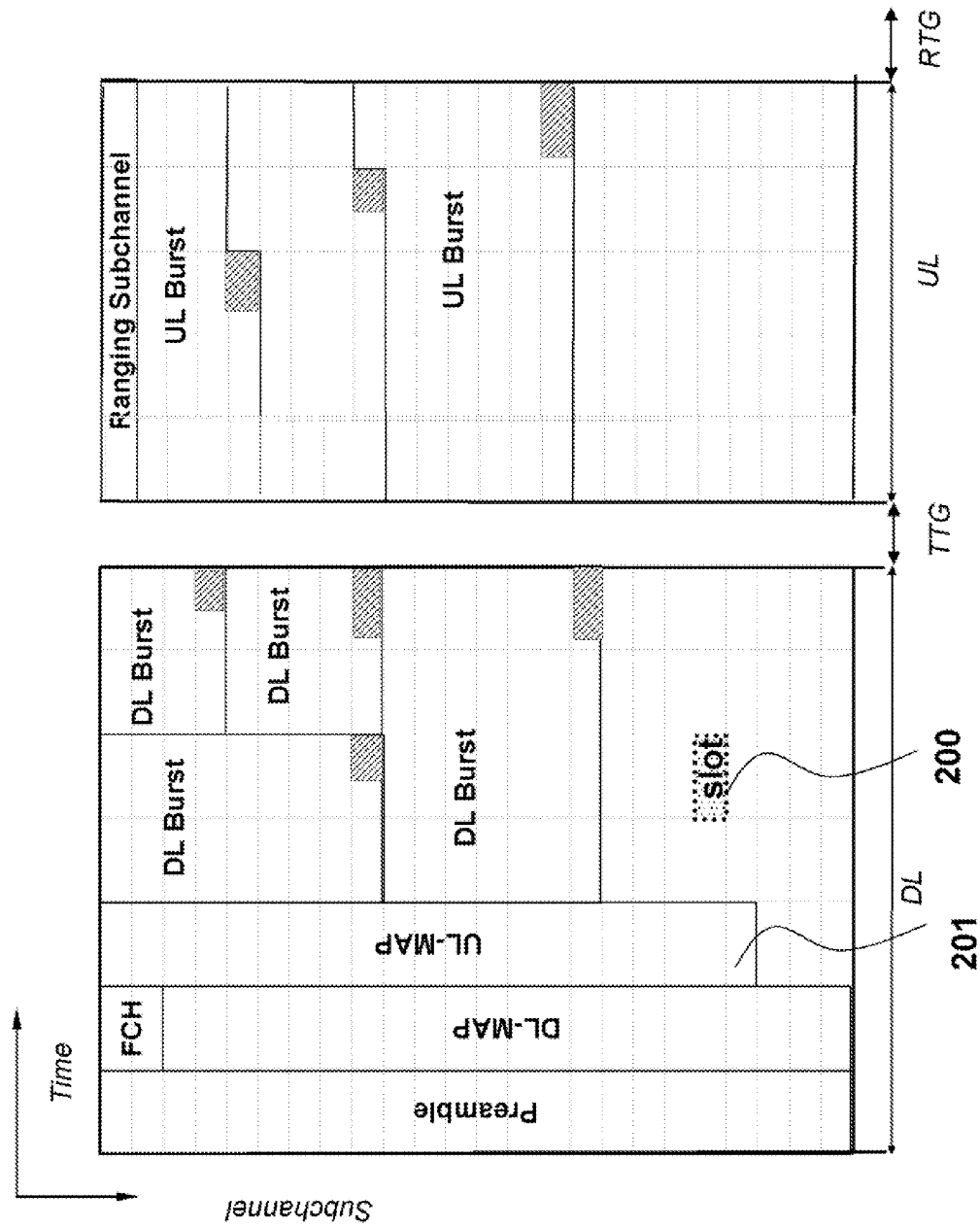
FIG. 2 is a block diagram of an IEEE 802.16 frame structure under TDD mode used by embodiments of the invention.
Figure 3:
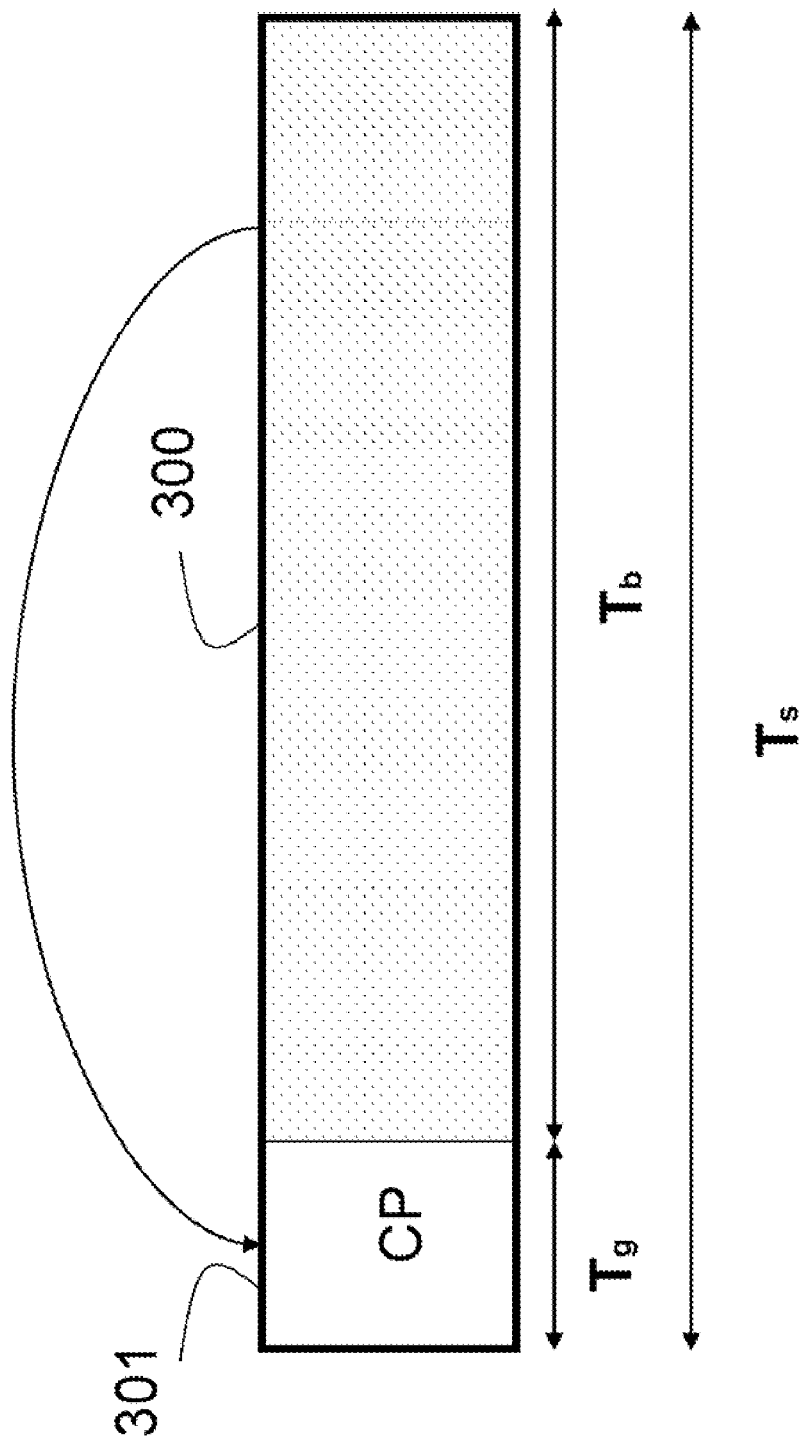
FIG. 3 is a schematic of an OFDMA symbol used by embodiments of the invention.
Figure 4:
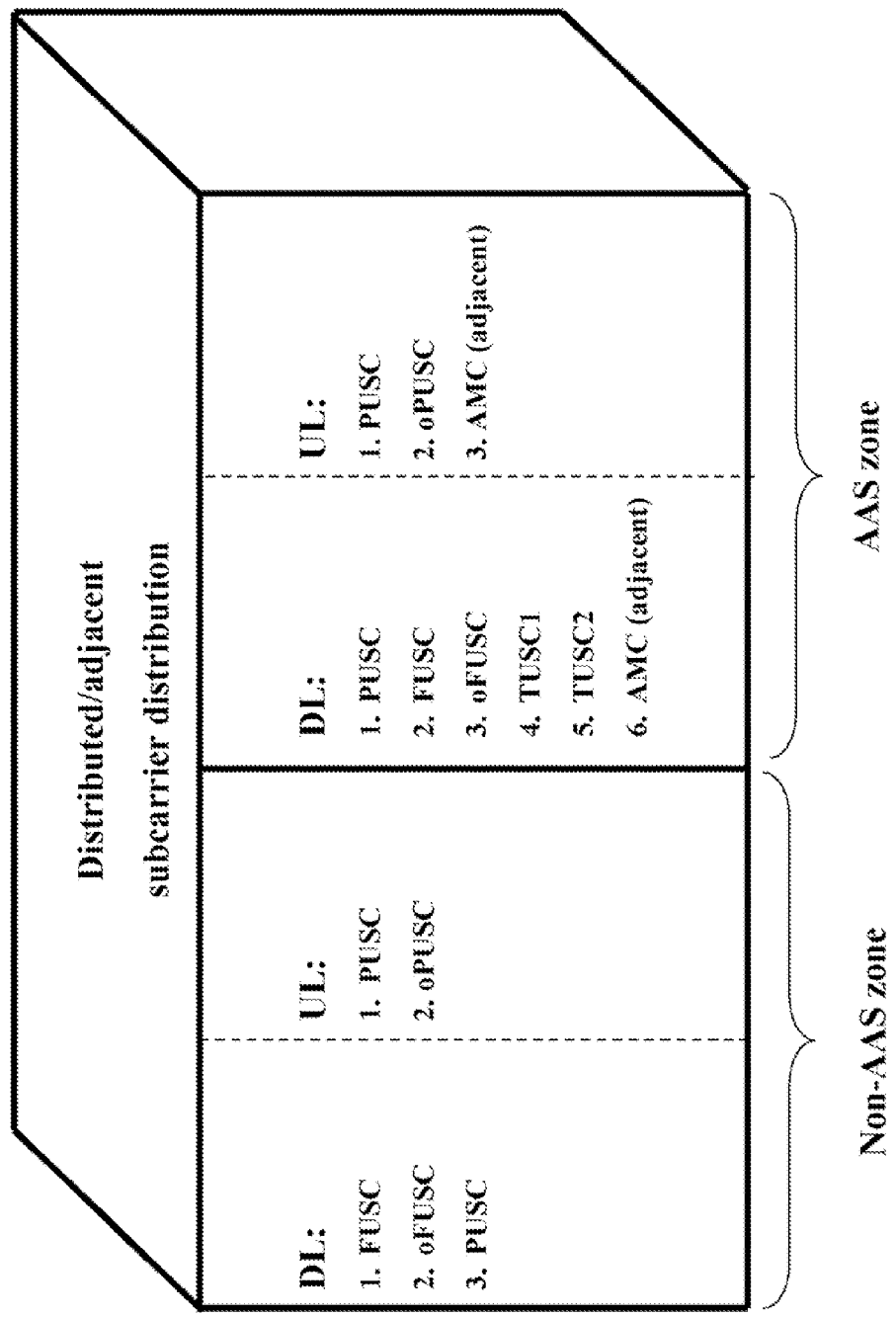
FIG. 4 is a schematic of partitions of UL/DL permutations according to embodiments of the invention.
Figure 5:
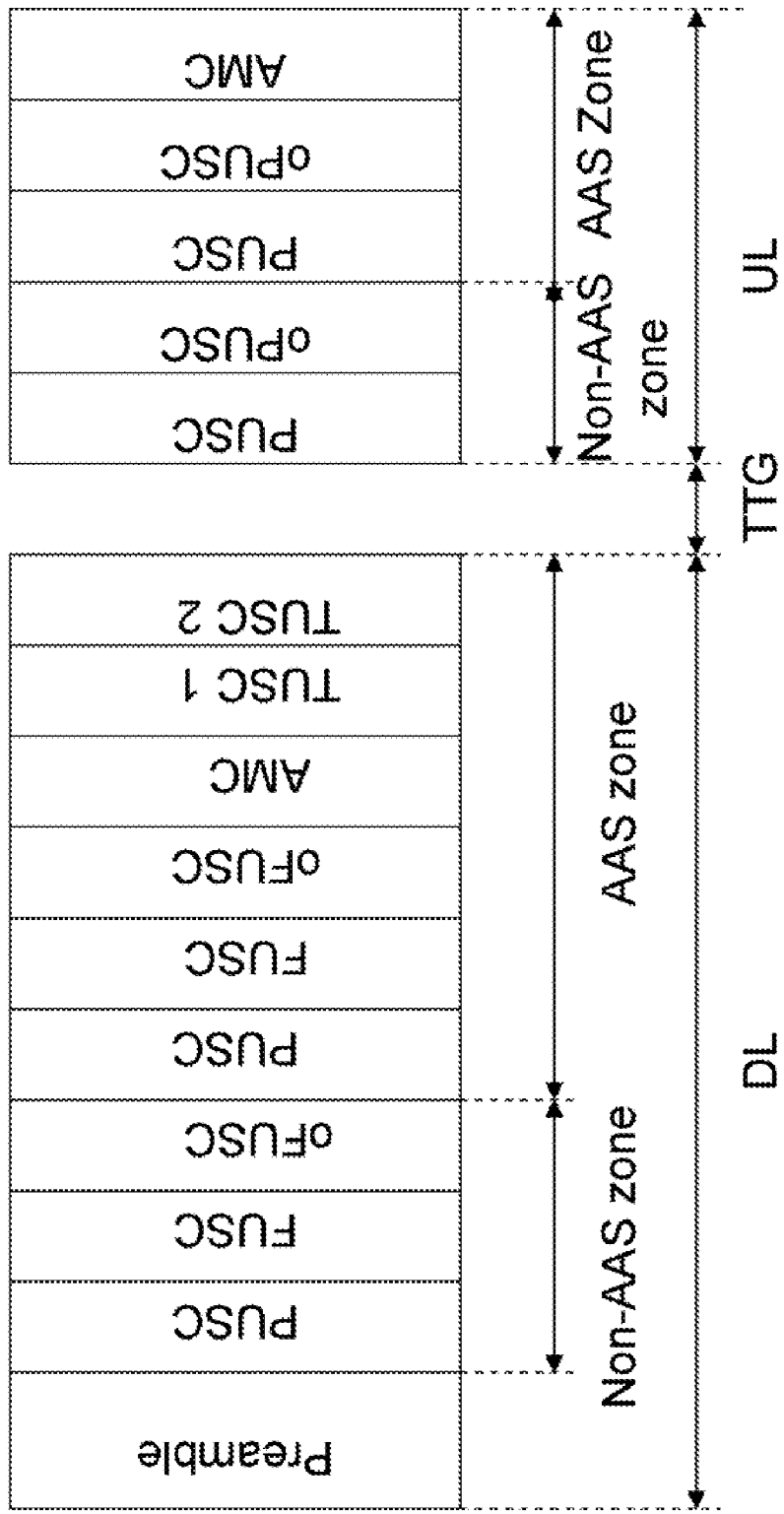
FIG. 5 is a schematic of partitions of UL/DL AAS and non-AAS zones and permutations according to embodiments of the invention.

Permutation Zone: A permutation zone is a number of contiguous OFDMA symbols in the DL or the UL. A permutation zone can include multiple users that use the same permutation formula. Both UL subframe and DL subframe can contain more than one permutation zones, as shown in FIG. 4. The used subcarriers (USC) are described below. The categories of permutation zones in AAS/Non-AAS zones and UL/DL are shown in FIG. 5. The permutations primarily differ in their slot size, the number and location of data/pilot subcarriers, and whether the subcarrier grouping is adjacent or distributed.

Antenna Switching

During antenna switching, a mobile station tests which set of antennas is optimal. Based on the channel state, as indicated perhaps by the channel gain of the received signal during the testing, an appropriate set of antennas is selected so that the system performance can be optimized. The set can include all antennas or a subset of the antennas.

For an OFDMA network, a station can switch antennas during the cyclic prefix (CP) period of an OFDMA symbol, and use the selected set of antennas to transmit or receive the OFDMA symbol. The antenna switching is usually completed in tens or hundreds of nanoseconds, while the CP duration is several microseconds. Therefore, the CP prefix is sufficiently long to support antenna switching without any loss of data.

Antenna selection can be performed in the transmitter (transmit antenna selection), the receiver (receive antenna selection), or both. For example, in an IEEE 802.16 network, antenna selection can be used at the BS or the MS, or both, in either the downlink or the uplink or both. However, due to cost or complexity considerations, it is usually the MS that has fewer RF chains than antennas.

Under most circumstances, antenna selection is only used when the number of antennas is greater than the number of RF chains. The following description thus focuses on antenna selection for the MS, which essentially refers to transmitter antenna selection in the uplink case and receiver antenna selection in the downlink case.

To support both transmitter antenna selection, in the uplink and receiver antenna selection in the downlink, we provide an adaptive antenna selection method for the MS. Nevertheless, the method described below can also apply to the BS.

The MS can be stationary, nomadic or mobile and can be located at any location In the coverage area of the BS. In the TDD system, DL and UL transmissions share the same frequency band in each frame. The frame duration of the IEEE 802.16 network is of the order of 10 ms, which is typically less than the channel coherence time. Hence, it is reasonable to assume that the UL and DL channels are reciprocal. By reciprocal, we mean that the channel states and qualities are substantially the same on the downlink and the uplink. Unreciprocal means that the channel states and qualities are substantially different.

When channel reciprocity is assumed, the same set of antennas can be used for the uplink transmission and the downlink reception by the mobile station. This simplifies the antenna selection for the MS, as the antenna subset selected for the downlink can be directly reused for the uplink, and vice versa. In an actual implementation, the RF chains for upconversion and downconversion in a device might be unreciprocal. Such a non-reciprocity can be eliminated by appropriate calibration, see, for example, H. Zhang, A. F. Molisch, and J. Zhang, "Applying antenna selection in WLANs for achieving broadband multimedia communication," IEEE Transactions on Broadcasting, vol. 52, pp. 475-482, 2006.

Nevertheless, it is not always valid to assume channel reciprocity, due to mobility of the MS, intra-cell interference or inter-cell interference. In addition, because different frequency resources may be allocated to the MS in the downlink and the uplink, because this is an OFDMA network, the antenna set selected for one direction may not be the best set for the reverse direction. In this case, it becomes necessary to perform antenna selection separately for the downlink and the uplink.

The adaptive antenna selection method according to embodiments of the invention can accommodate both reciprocal and unreciprocal channels as described above.

Adaptive Antenna Selection Protocol

On the uplink, the BS monitors the pilot signal from each MS to obtain the channel state. The MS also measures the channel state of the downlink and transmits this information to the BS either using a channel quality information channel (CQICH) or by means of a channel measurement report response (REP-RSP) message on the uplink. Based upon the channel state information, the BS can determine not only whether the uplink and downlink channels are reciprocal or not, but also whether or not the uplink channel has an acceptable quality. If the BS finds that the channel is unreciprocal and the uplink channel quality is unacceptable, an indication can be signaled to the MS to initiate transmit antenna selection by transmitting with different sets of antennas. This enables the base station to determine a best set of transmit antennas. The mobile station can also select the set of receive antennas based on the downlink channel state and quality.

Reciprocal Channel

When the channel is reciprocal, the best set of antennas for receiving on the downlink and transmitting on the uplink is the same.

The MS, as the receiver in the downlink, can measure the state of the channel almost instantaneously. Thus, the MS can itself determine whether and when to start the antenna selection process based on local information such as the signal to interference noise ratio (SINR), packet loss rate, etc. For example, when the MS realizes that the received signal quality degrades below a certain threshold in terms of SINR, the MS can start the receive antenna selection process.

When the BS transmits to the MS in the downlink, the BS usually embeds pilot subcarriers in the entire frequency resource block assigned to the MS in order to facilitate the MS to estimate the downlink and to coherently demodulate the downlink signal. These pilot subcarriers can be used for antenna selection purpose as well.

Specifically, after the MS begins the antenna selection process, the MS uses different sets of antennas to receive different OFDMA symbols that contain pilot subcarriers, and the MS estimates the channel state associated with each different set of antennas.

The manner in which pilot subcarriers are embedded in the allocated resource block determines how the antenna switching takes place. Because the pilot subcarrier, also known as the pilot, has different locations in different permutation schemes, we describe each permutation scheme separately.

The following permutation schemes are defined in the IEEE 802.16 standard for the downlink:

DL Fully Used Subcarrier (FUSC) Mode

In DL FUSC mode, a slot consists of one sub-channel (in frequency domain) and one OFDMA symbol (in time domain). This is particular to OFDMA networks. The FUSC slot does not include pilot subcarriers. In the DL FUSC mode, all the pilot subcarrier locations are predefined. The remaining subcarriers are further partitioned into slots that are used for transmitting data. The pilot subcarriers exist in every OFDMA symbol of the FUSC zone, and are used by all the MSs for DL channel estimation. Therefore, the MS can receive every OFDMA symbol with a different set of antennas, and thus estimate the channel response of different antenna sets. This is not possible with OFDM networks.

DL Optional FUSC Mode

The DL oFUSC mode is an optional DL permutation type used by the BS. As in FUSC, the oFUSC slot consists of one sub-channel in frequency domain and one OFDMA symbol in time domain, and does not include any pilot subcarriers. As in FUSC, the pilot subcarriers exist in every OFDMA symbol are used by all the MSs for DL channel estimation. Thus, the antenna switching process is similar to that in the DL FUSC zone.

DL Partial Used Subcarrier (PUSC) Mode

Figure 6:
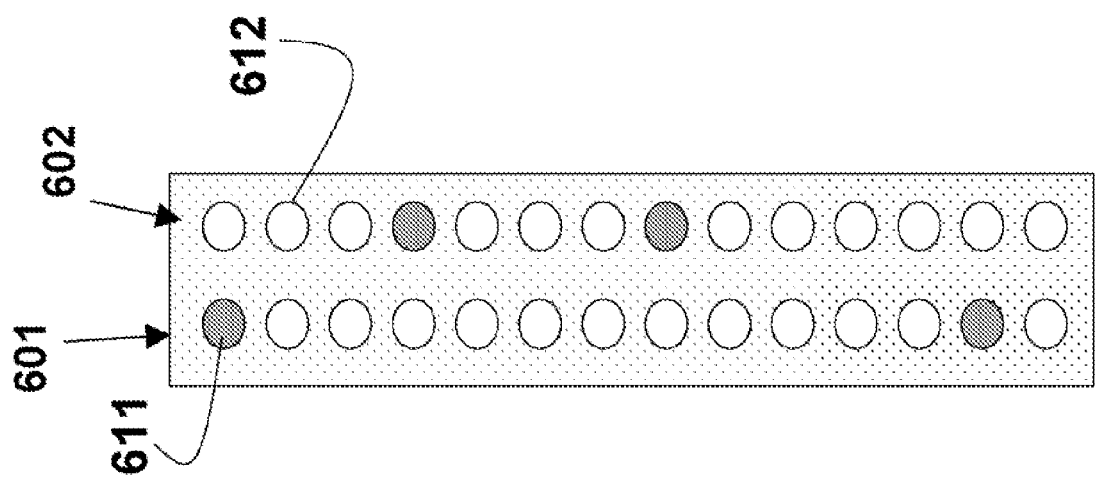
FIG. 6 is a schematic of a DL PUSC zone according to embodiments of the invention.

As shown in FIG. 6, each slot consists of two contiguous OFDMA symbols (in time) and one sub-channel (in frequency). Each sub-channel consists of 14 subcarriers. The OFDMA symbols can be called odd 601 and even 602 symbols. The location of pilot symbols 611 and data 612 is different in the odd and even OFDMA symbols.

Figure 7:
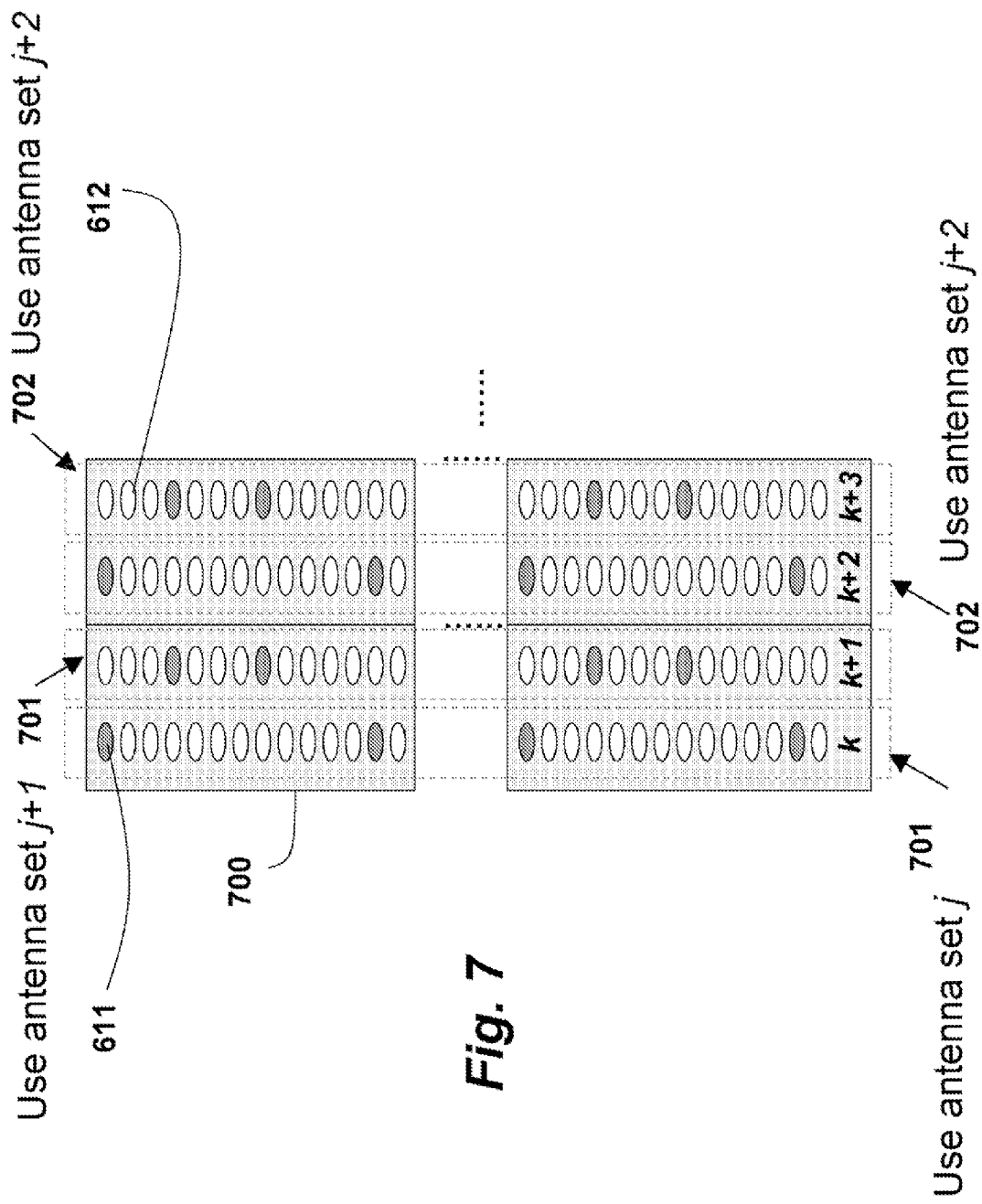
FIG. 7 is a block diagram of antenna switching for DL PUSC zone according to embodiments of the invention.

FIG. 7 shows an example where the MS uses antenna set j 701 to receive symbol k 700. Then, MS switches to antenna set j+1 702, for example during the cyclic prefix of symbol k+1, to receive symbol k+1. This process may be continued for symbols k+2, k+3, etc., until all additional antenna sets have been tested. However, depending on the selection algorithm used by the receiver, only a few antenna subsets may be tested. Based on the channel state information of the antenna sets received with thus far, the MS can determine the antenna set to use to optimize performance.

DL Tile Used Subcarrier (TUSC) 1, 2 Mode

TUSC 1 and TUSC2 are two optional permutation modes defined for the 802.16e DL. These two zones exist only in the AAS zone. The slot structures of TUSC 1 and TUSC 2 are the same as those for UL PUSC and UL oPUSC modes, respectively. A detailed description of UL PUSC and UL oPUSC modes is provided below.

DL Adaptive Modulation Coding (AMC) Mode

Figure 8:
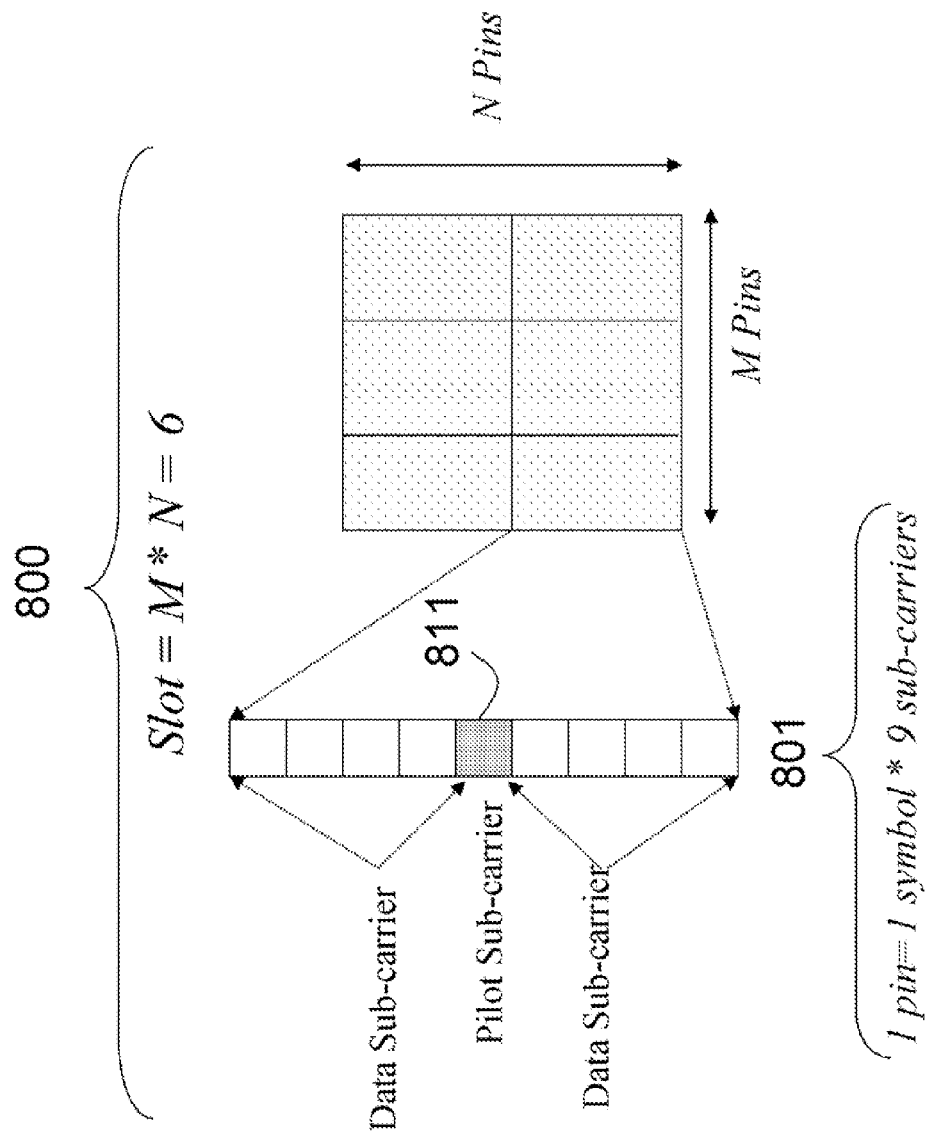
FIG. 8 is a schematic of DL/UL AMC permutation for the AAS zone according to embodiments of the invention.

The DL AMC mode is an optional permutation mode for 802.16e. The subcarriers are grouped in each sub-channel and are physically adjacent. The slot structure is shown in FIG. 8. Each slot 800 consists of 6 pins. Each pin consists of one OFDMA symbol long and nine subcarriers wide. The middle subcarrier 811 is a pilot subcarrier, and the other subcarriers are used for data. There are 4 types of AMC modes depending on how 6 is factorized: 1×6, 6×1, 2×3, and 3×2, where the first term denotes time, and the second term denotes frequency. As every symbol in the DL AMC slot has a pilot, the MS can test different antenna sets in different symbol.

When the MS performs antenna switching, the MS can test some or all possible antenna set combinations, before it selects tire best antenna set. Due to the channel reciprocity, the same antenna set selected for reception on the downlink can then be used for transmission on the uplink. Since receive antenna selection for the downlink is performed locally, no other notification is needed.

Unreciprocal Channel

When the uplink and downlink channels are not reciprocal, the antenna set selected for receiving on the downlink may not be suited for transmitting on the uplink. Therefore, one set may be selected for the uplink, and another set may be selected for the downlink to optimize their respective performances.

Specifically, if the BS realizes that the uplink and downlink channels are unreciprocal and determines that a transmit antenna selection should be performed, it informs the MS by transmitting a request to beginning the antenna selection process. The signal is in the form of an antenna selection control (ASC) UL information element (IE) in the UL MAP 201 when the BS determines that transmit antenna selection should be performed. Otherwise, if no ASC UL IE appears in the UL MAP, no UL antenna selection is needed by the MS in this frame.

After being notified by BS, the MS uses the current antenna set to transmit the first OFDMA symbol allocated to it that contains pilot subcarrier(s), and then uses different antenna sets to transmit subsequent OFDMA symbols that contains pilot subcarrier(s). Thus, the BS can estimate the channel response associated with each different antenna set used by the MS transmits. Based upon the estimated channel state, the BS determines which transmit antenna set at the MS results in the best performance and notifies the MS about the best set by means of the ASC UL IE. The MS then use the selected best antenna set to transmit subsequent frames in the uplink.

The ASC UL IE, which is defined in Table 1, is an extended UL-MAP IE to support antenna selection signaling.

TABLE 1

| OFDMA Antenna Selection Control IE | | |
|---|---|---|
| Syntax | Size (bit) | Notes |
| Antenna_Selection_Control_IE( ) { | — | — |
| Extended UIUC | 4 | Antenna selection control = 0x0B |
| Length | 4 | Length = 0x01 |

TABLE 1-continued

| OFDMA Antenna Selection Control IE | | |
|---|---|---|
| Syntax | Size (bit) | Notes |
| UL_AS_Indication | 1 | Indicates whether mobile station shall perform uplink transmit antenna selection in the current frame. |
| UL_AS_Selection | 7 | The value of this field indicates which antenna set shall be chosen by the MS for uplink transmission. |
| } | | |

The "extended UIUC" field in the ASC UL IE, which has a value "0x0B" as an embodiment of the invention, indicates that this IE is an extended UIUC IE. The "length" field indicates the length in bytes of the subsequent "UL_AS_Indication" and "UL_AS_Selection" field.

The "UL_AS_Indication" field, when set to 1 (unreciprocal case), indicates that the MS should perform uplink transmit antenna selection in the current frame. If this field is set to 0, then the MS uses the "UL_AS_Selection" field to determine the antenna set selected by the BS. More specifically, the value of the "UL_AS_Selection" field indicates which antenna set has been selected for future transmission. For example, if "UL_AS_Indication" field is "0x01", this means that the antenna set switched to immediately after using the original antenna set should be chosen for subsequent uplink transmission. To make the MS use the same antenna set, the BS sends "0x00".

Similar to the downlink case, antenna switching and selecting is dependent on the specific permutation used in the uplink. Therefore, we describe the antenna switching for each uplink permutation scheme below.

UL Partially Used Subcarrier (PUSC) Mode

Figure 9:
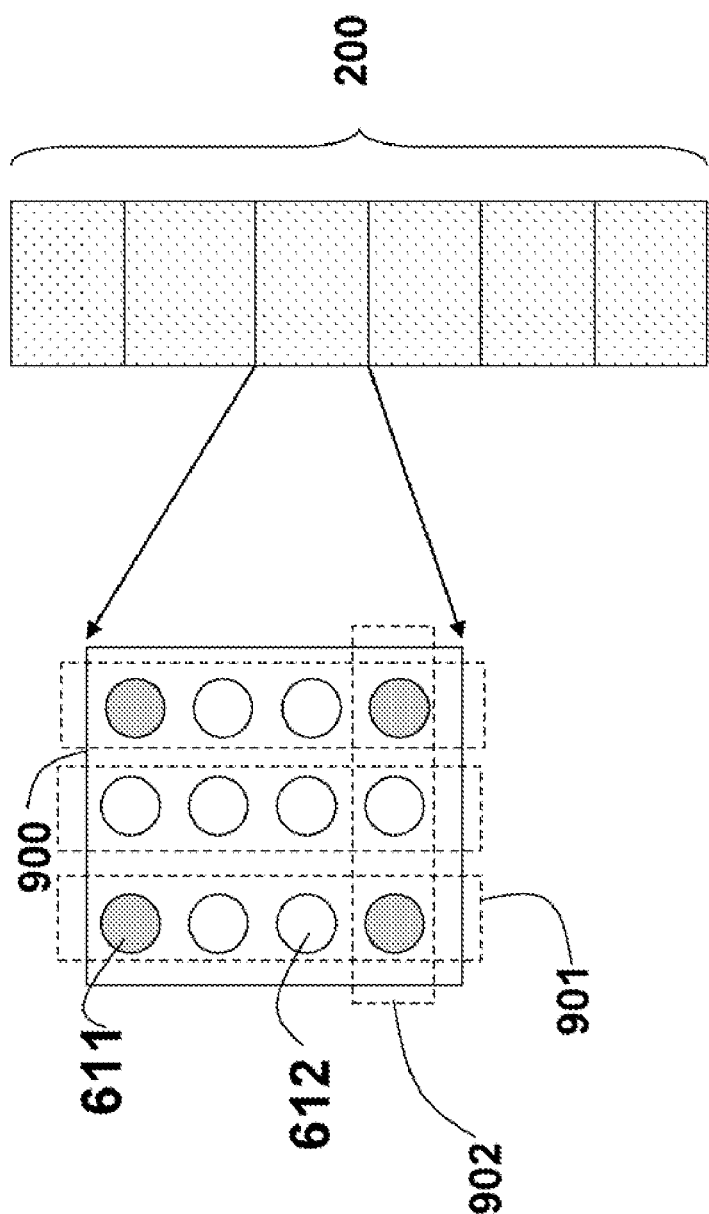
FIG. 9 is a schematic of UL PUSC zone according to embodiments of the invention.

UL PUSC is a mandatory UL permutation mode. The smallest resource allocation unit is a slot 200, which is shown in FIG. 9. Each slot comprises 6 tiles 900, where each tile consists of three OFDMA symbols 901 and four subcarriers 902. Some of the subcarriers in the OFDMA symbols are pilots 611 and the rest are data 612. However, not all the OFDMA symbols contain pilot subcarriers.

Figure 10:
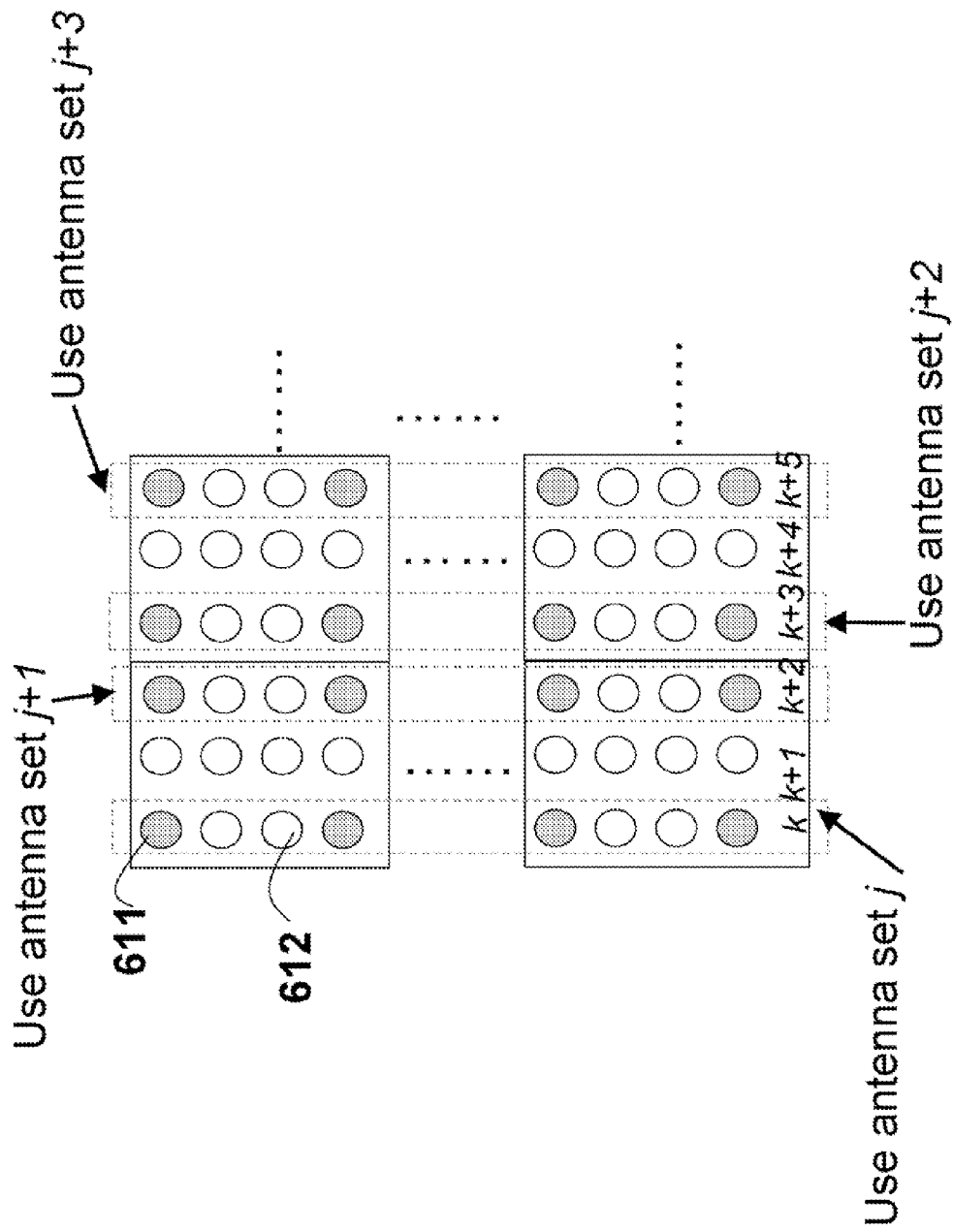
FIG. 10 is an example of antenna switching for UL PUSC zone according to embodiments of the invention.

FIG. 10 shows how antenna switching occurs in the UL PUSC zone. Specifically, the MS transmits using antenna set j for OFDMA symbols k. Because the symbol k contains pilot subcarrier(s), the BS can estimate the downlink channel state of the downlink channel accordingly. Then, the MS switches to antenna set j+1, for example in the cyclic prefix of symbol k+2, so that it can transmit using antenna set j+1 for the duration of the symbol k+2. Similarly, based on the pilot subcarrier(s) in symbol k+2, the BS can estimate the uplink channel state when the antenna set j+1 is used.

This antenna switching process continues until the MS finishes testing all possible antenna sets or it terminates the process prematurely otherwise. Then, the BS can select the most appropriate antenna set based on selection criteria such as channel state or SINR or capacity, and feedback the selected antenna set to the MS.

UL Optional PUSC (oPUSC) Mode

Figure 11:
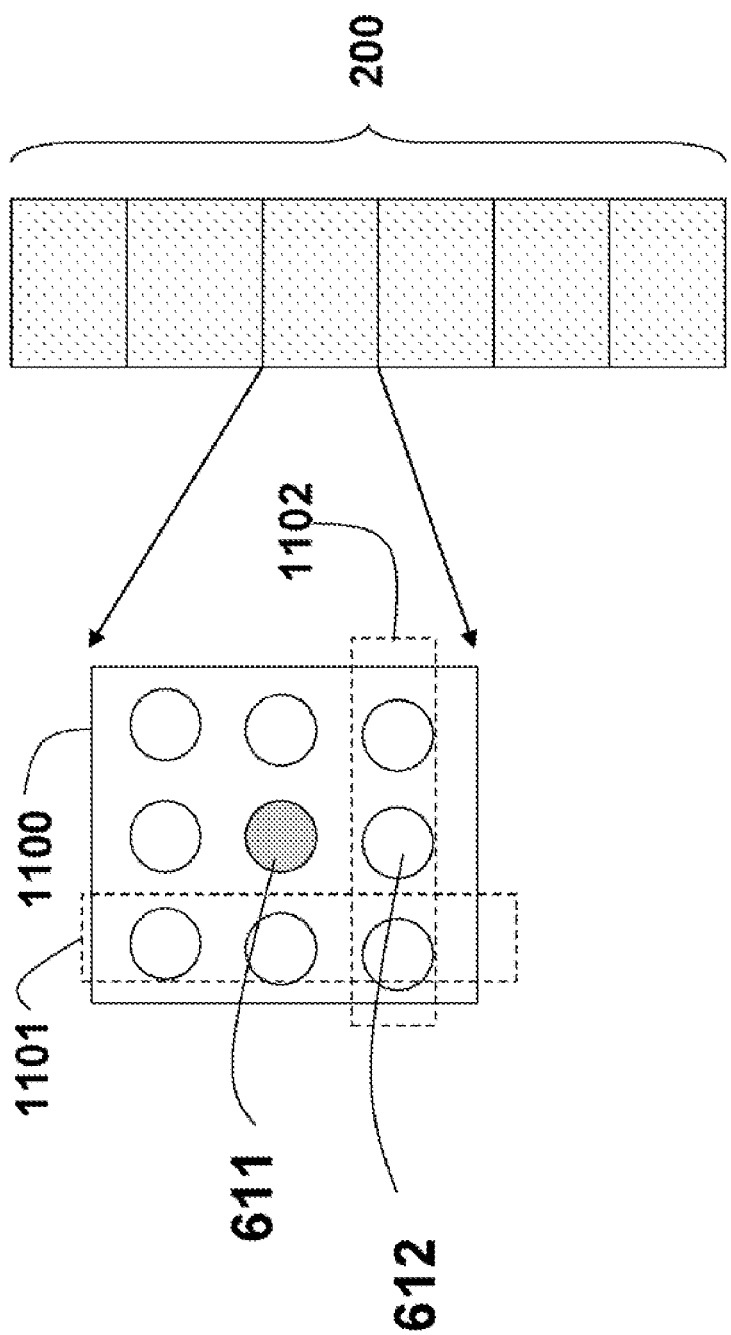
FIG. 11 is a schematic of UL oPUSC according to embodiments of the invention.

The UL oPUSC mode is an optional permutation mode used by the MS for the UL. As shown in FIG. 11, each slot consists of six tiles 1100 and each tile includes three OFDMA symbols 1101 and three subcarriers 1102. The pilot subcarrier is present only in the middle OFDMA symbol.

Figure 12:
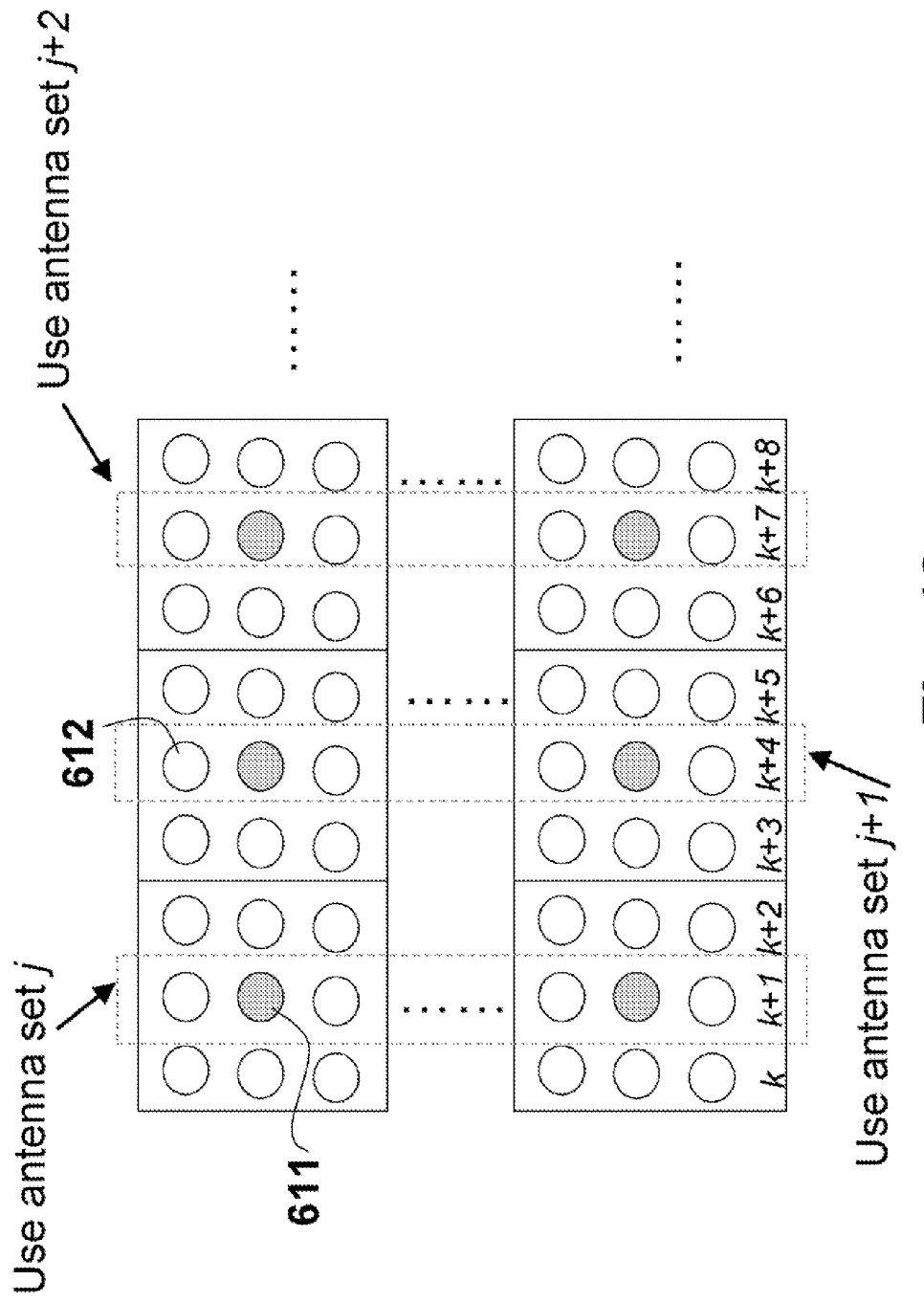
FIG. 12 is an example of antenna switching for UL oPUSC zone according to embodiments of the invention.

FIG. 12 shows antenna switching occurs in UL oPUSC zone. It illustrates the case, when the MS is currently using antenna set j for transmission in the uplink for symbols k+1. When the MS receives an antenna switching notification from the BS, the MS switches to another antenna set j+1 during the cyclic prefix period of symbol k+4, and use the set j+1 during the symbols k+4. This process continues until the MS terminates the process of antenna selection. The BS selects the best antenna set based upon the channel state results obtained thus far, and feeds back the selected antenna set to the MS.

UL Adaptive Modulation Coding (AMC) Mode

This is an optional permutation mode in the IEEE 802.16e. The subcarriers grouped in each sub-channel are physically adjacent. The slot structure is shown in FIG. 8. Each slot comprises 6 pins. Each pin consists of one OFDMA symbol and 9 subcarriers per OFDMA symbol. The middle subcarrier is used for pilot signal. The AMC mode contains four types based on how the pins are stacked in time-frequency: m×n={1×6,6×1,2×3,3×2}, where the first term denotes time, and the second term denotes frequency.

Notification

Before the MS performs transmit or receive antenna selection, the MS informs the BS of its capability of supporting such functionality by exchanging Subscriber Station Basic Capability Request (SBC-REQ) and SS Basic Capability Response (SBC-RSP) messages with the BS.

Specifically, when the MS performs initialization and joins the network, the MS sends an SS Basic Capability Request (SBC-REQ) message to indicate to the BS that the MS can perform antenna selection. The format of SBC-REQ message is shown in Table 2. All the message format descriptions provided here are only examples.

TABLE 2

SBC-REQ message format

| Syntax | Size (bit) | Notes |
| --- | --- | --- |
| SBC-REQ_Message_Format( ) { | — | — |
| Management Message Type = 26 | 8 | — |
| TLV Encoded Information | variable | Type-Length-Value (TLV) specific |
| } | | |

SBC-REQ indicates the SS Capabilities Encodings that are necessary for effective communication with the SS during the remainder of the initialization protocol. "Physical parameters supported" encoding is one of those parameters that is included in the SBC-REQ.

In the downlink, the "OFDMA SS Demodulator for MIMO Support", which indicates the MIMO capability of OFDMA SS demodulator, is as shown in Table 3 to support the antenna selection protocol. More specifically, bit 20 in the "OFDMA SS Demodulator for MIMO Support" is used to indicate the support for receive antenna selection capability for the downlink. If this bit is set to 1, downlink receive antenna selection is supported. Otherwise, if the bit is 0, the capability is not supported.

TABLE 3

OFDMA SS Demodulator for MIMO Support

| Type | Length | Value | Scope |
| --- | --- | --- | --- |
| 176 | 3 | Bit 0: 2-antenna STC matrix A<br>Bit 1: 2-antenna STC matrix B, vertical coding | SBC-REQ, SBC-RSP |
| | | Bit 2: Four receive antennas<br>Bit 3: 4-antenna STC matrix A<br>Bit 4: 4-antenna STC matrix B, vertical coding<br>Bit 5: 4-antenna STC matrix B, horizontal coding<br>Bit 6: 4-antenna STC matrix C, vertical coding Bit<br>7: 4-antenna STC matrix C, horizontal coding<br>Bit 8: 3-antenna STC matrix A<br>Bit 9: 3-antenna STC matrix B<br>Bit 10: 3-antenna STC matrix C, vertical coding<br>Bit 11: 3-antenna STC matrix C, horizontal coding<br>Bit 12: Capable of calculating precoding weight<br>Bit 13: Capable of adaptive rate control<br>Bit 14: Capable of calculating channel matrix<br>Bit 15: Capable of antenna grouping<br>Bit 16: Capable of antenna selection<br>Bit 17: Capable of codebook based precoding<br>Bit 18: Capable of long-term precoding<br>Bit 19: Capable of MIMO Midamble<br>Bit 20: Capable of downlink receive antenna selection<br>Bits 21-23: Reserved | |

Similarly, in the uplink, the "OFDMA SS Modulator for MIMO Support", which indicates the MIMO capability of OFDMA SS modulator, is as shown in Table 4 to support the transmit antenna selection capability for the uplink. The bit 7 indicates whether uplink transmit antenna selection is supported. If this bit is set to 1, then uplink transmit antenna selection is supported. Otherwise, it is not.

TABLE 4

OFDMA SS Modulator for MIMO Support

| Type | Length | Value | Scope |
| --- | --- | --- | --- |
| 177 | 1 | Bit 0: Two Tx antennas<br>Bit 1: Capable of Tx diversity<br>Bit 2: Capable of spatial multiplexing<br>Bit 3: Capable of beamforming<br>Bit 4: Capable of adaptive rate control<br>Bit 5: Capable of single antenna<br>Bit 6: Capable of two antennas<br>Bit 7: Capable of uplink transmit antenna selection | SBC-REQ, SBC-RSP |

In response to the received SBC-REQ, the BS sends an SBC-RSP to the MS. The format of the SBC-RSP is similar to SBC-REQ, except that the "management message type" field has a value of 27, instead of 26. The BS can use "OFDMA SS Modulator for MIMO Support" TLV and "OFDMA SS Demodulator Support" TLV as shown in Table 3 and 4 in the SBC-RSP message to indicate whether the BS supports corresponding antenna selection capability or not. Note that other available values of the field can also be used.

In addition, MS may inform the BS of the number of possible antenna set combinations the MS tests. Therefore, we define two new TLVs in Table 5 and 6 to support this signaling.

TABLE 5

OFDMA SS Antenna Selection Uplink Support

| Type | Length | Value | Scope |
|---|---|---|---|
| 203 | 1 | Indicate the number of antenna set combinations the uplink MS transmit antenna selection will test | SBC-REQ, SBC-RSP |

TABLE 6

OFDMA SS Antenna Selection Downlink Support

| Type | Length | Value | Scope |
|---|---|---|---|
| 204 | 1 | Indicate the number of antenna set combinations the downlink MS receive antenna selection will test | SBC-REQ, SBC-RSP |

By knowing the number of sets that are tested, the BS can simply signal the index to the order in which the sets are tested to indicate the best set.

Figure 13:
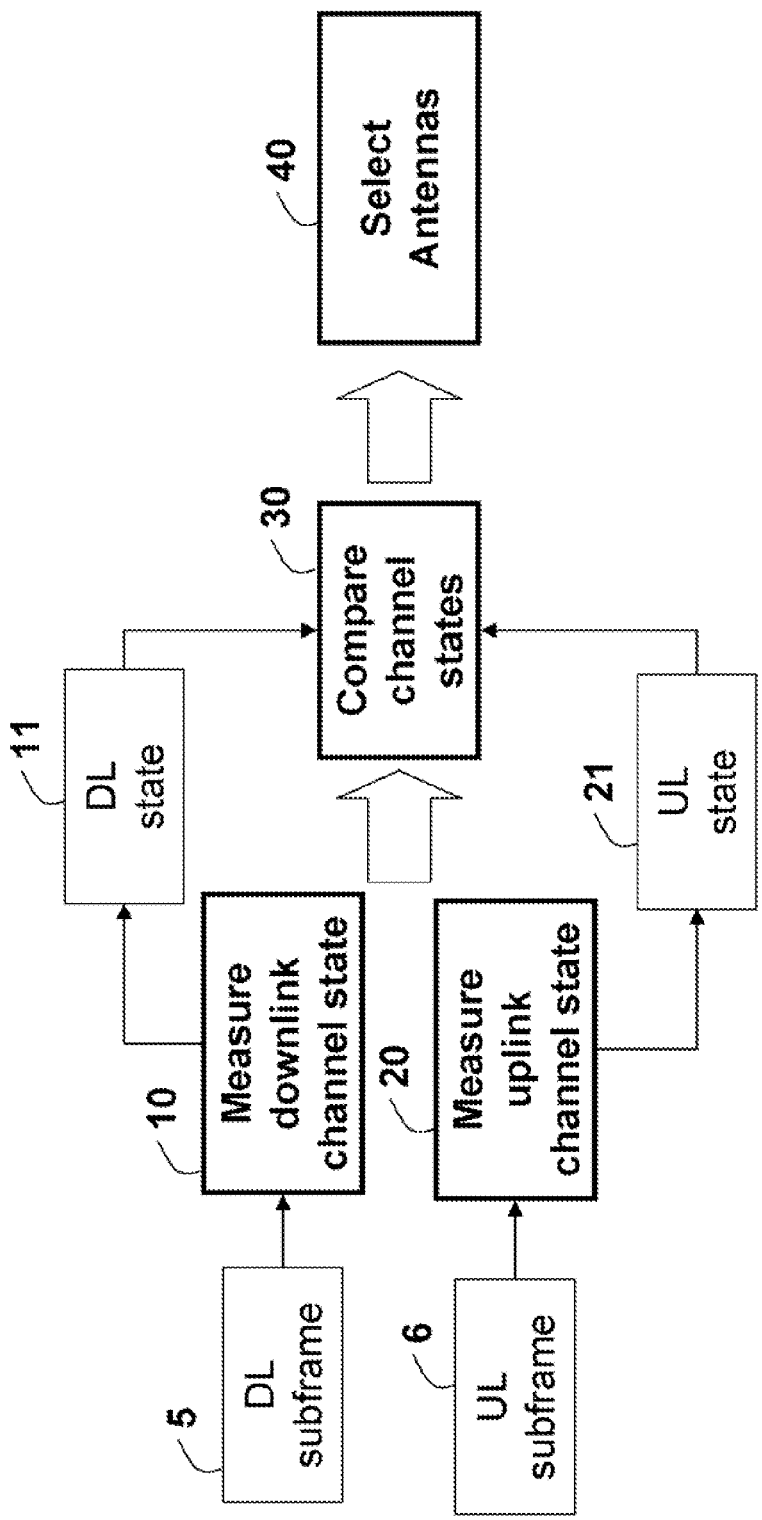
FIG. 13 is a flow diagram of a method for selecting antennas according to an embodiment of the invention.

FIG. 13 show the steps of the general method for selecting antennas in an OFDMA network. A DL channel state 11 of a downlink is measured 10 using a downlink subframe 5 received in a mobile station from a base station. An UL channel state 21 of an uplink is measured 20 using an uplink subframe 6 received in the base station from the mobile station. Next, the method compares 30 the channel states to determine whether the downlink and the uplink are reciprocal or not. The mobile station can perform receive antenna, selection 40 based on the quality of the downlink channel state. The mobile station can also perform transmit antenna selection.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for selecting antennas in an OFDMA wireless network including a base station and a mobile station having a plurality of antennas, comprising:
    measuring a channel state of a downlink using a downlink subframe received in a mobile station from a base station in an OFDMA wireless network;
    measuring a channel state of an uplink using an uplink subframe received in the base station from the mobile station;
    comparing the channel states of the downlink and the uplink; and
    selecting a set of antennas in the mobile station based on the comparing.

2. The method of claim 1, in which the uplink subframe includes the channel state of the downlink and the comparing is performed in the base station.

3. The method of claim 1, in which the bases station determines if the downlink and the uplink are unreciprocal and a quality of the uplink is unacceptable, and further comprising:
    transmitting a request to the mobile station to transmit with different sets of transmit antennas; and
    transmitting to the base station with the different set of transmit antennas.

4. The method of claim 1, in which the selected set of antennas is for receiving on the downlink.

5. The method of claim 3, further comprising:
    indicating, by the base station, a best set of transmit antennas of the different sets of transmit antennas; and
    selecting the best set of transmit antennas in the mobile station to transmit to the base station on the uplink.

6. The method of claim 1, in which one set of antennas is selected for receiving on the downlink and another set of antennas is selected for transmitting on the uplink.

7. The method of claim 1, further comprising;
    initiating the selecting based on the channel state of the downlink if the downlink and the uplink are reciprocal.

8. The method of claim 4, further comprising:
    measuring a quality of the downlink for the different sets of the antennas.

9. The method of claim 8, in which the mobile station selects a best set of antennas based on the qualities of the downlink measured with the different sets of antennas.

10. The method of claim 1, in which a need to select the set of antennas indicated in an UL MAP of a frame used for antenna selection.

11. The method of claim 1, further comprising:
    selecting a set of antennas in the mobile station if the downlink and the uplink are reciprocal.

12. The method of claim 1, further comprising:
    measuring, in the base station, a quality of the uplink for different sets of antennas; and
    signaling a best set antennas to the mobile station based on the quality.

13. The method of claim 12, in which the mobile station selects the best set of antennas.

14. The method of claim 12, further comprising:
    signaling an index to an order in which the different sets measure the quality.

15. The method of claim 1, in which the mobile station signals an ability to select antennas to the base station.

* * * * *